US 6,715,296 B2

(12) United States Patent
Bakran et al.

(10) Patent No.: US 6,715,296 B2
(45) Date of Patent: Apr. 6, 2004

(54) METHOD FOR STARTING A POWER PLANT

(75) Inventors: Velimir Bakran, Rimbach (CH); Hermann Engesser, Baden-Ruetihof (CH); Peter Keller-Sornig, Baden (CH); Ilja Tuschy, Heidelberg (DE)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/216,277

(22) Filed: Aug. 12, 2002

(65) Prior Publication Data
US 2003/0033814 A1 Feb. 20, 2003

Related U.S. Application Data
(60) Provisional application No. 60/312,780, filed on Aug. 17, 2001.

(51) Int. Cl.[7] .............................. F02C 7/26; F02C 7/10
(52) U.S. Cl. ......................... 60/778; 60/787; 60/39.17; 60/39.511
(58) Field of Search ................. 60/778, 787, 39.17, 60/39.511, 653, 676

(56) References Cited

U.S. PATENT DOCUMENTS

| | | | |
|---|---|---|---|
| 3,344,486 A | * | 10/1967 | Scholz .......................... 24/194 |
| 4,033,114 A | * | 7/1977 | Zaugg .......................... 60/778 |
| 4,043,120 A | * | 8/1977 | Hoffeins ....................... 60/787 |
| 5,083,425 A | * | 1/1992 | Hendriks et al. ........ 60/39.183 |
| 5,319,925 A | * | 6/1994 | Hendriks et al. ........ 60/39.183 |
| 5,586,429 A | * | 12/1996 | Kesseli et al. ................ 60/785 |
| 6,313,544 B1 | * | 11/2001 | Mongia et al. ............... 290/52 |

* cited by examiner

Primary Examiner—Charles G. Freay
(74) Attorney, Agent, or Firm—Burns, Doane, Swecker & Mathis, L.L.P.

(57) ABSTRACT

The invention relates to a method for starting a power plant (1), in particular a gas storage power plant, with the following steps:

S1: ignition of an auxiliary combustion chamber (19),

S2: operation of the auxiliary combustion chamber (19) in such a way that the consequently heated gas introduced into a first flow path (13) has a temperature which is below a self-ignition temperature of a fuel/oxidizer/gas mixture delivered to the main combustion chamber (5) for starting the latter, S3: operation of the auxiliary combustion chamber (19) according to step S2, until a recuperator (12) has a predetermined preheating temperature, S4: Starting of a turbine (3) and ignition of the main combustion chamber (5).

15 Claims, 1 Drawing Sheet

METHOD FOR STARTING A POWER PLANT

This Application claims the benefit of Ser. No. 60/312,780, filed Aug. 17, 2001.

FIELD OF THE INVENTION

The invention relates to a method for starting a power plant having at least one turbo group and one recuperator

BACKGROUND OF THE INVENTION

A power plant conventionally comprises a turbogroup with at least one turbine and with at least one main combustion chamber which is assigned at least one burner and which is arranged upstream of the turbine and, during operation, generates hot gases acting upon the turbine. A generator for current generation may be drive-connected to this turbogroup. With the aid of a recuperator, which is arranged, on the one hand, in a first flow path leading exhaust gas away from the turbogroup and, on the other hand, in a second flow path leading fresh gas toward the turbogroup, heat is extracted from the exhaust gases during normal operation, in order thereby to preheat the fresh gases. Moreover, to increase efficiency, an additional firing device, by means of which the temperature level of the preheated fresh gases supplied to the turbogroup can be additionally increased, may be arranged within the recuperator in the first flow path leading the exhaust gases.

The power plant can be shut down during times of low current demand, for example at night or at the weekend, or for maintenance purposes. As a result, in particular, the turbogroup and the recuperator cool down to a greater or lesser extent. In this case, as a rule, the recuperator cools down more rapidly than the components of the turbogroup. So that the power plant or the respective turbogroup can develop its full power output as quickly as possible, it is expedient, for starting the plant, to preheat the recuperator. Particularly with regard to gas storage power plants within what is known as a Compressed-Air Energy Storage System, CAES system in short, starting operations occur relatively frequently. This is because the basic idea of a CAES system is seen in storing excess energy generated by permanently operated power plants during the base-load times and utilizing it later, for example, for peak-load generation. This is achieved in that air or another gas is pumped under relatively high pressure with the aid of the excess energy into a store, from which the air or the gas can be extracted, as required, for current generation. This means that the energy is kept retrievably in stock in the form of potential energy. Used-up coal mines or salt mines, for example, serve as stores.

For the profitability of power plants, in particular of gas storage power plants, therefore, it is of considerable usefulness to shorten the starting procedure.

An important measure for shortening the starting procedure is seen in the preheating of the recuperator. In this case, it is basically possible to preheat the recuperator by putting into operation the additional firing device normally arranged in the recuperator. However, this may give rise locally in the recuperator, in particular near the additional firing device, to hot zones or spots, the temperature of which is above a self-ignition temperature of a fuel/oxidizer mixture which is supplied to the main combustion chamber for combustion in order to start the turbogroup. Hot zones or spots of this kind have a disadvantage when, with the recuperator preheated, an attempt to ignite the main combustion chamber goes wrong, since the combustible fuel/oxidizer mixture then comes into contact with these hot zones or spots and may ignite there in an undesirable way.

SUMMARY OF THE INVENTION

The invention is intended to remedy this. The invention, as characterized in the claims, is concerned with the problem, for a power plant with a turbogroup and a recuperator, of finding a way of making it possible to have a shortened starting method during which the recuperator is preheated, without the risk of critical local hotspots at the same time occurring in the recuperator.

This problem is solved by means of the subject of the independent claims. Advantageous refinements are the subject matter of the dependent claims.

The present invention is based on the general idea of preheating the recuperator with the aid of an auxiliary combustion chamber which is assigned at least one burner and which is arranged outside the first flow path, that is to say, in particular, outside the recuperator. This measure makes it possible to ensure in a particularly simple way that the critical self-ignition temperature of the fuel/oxidizer mixture is not reached at any point in the first and/or in the second flow path and therefore in the recuperator. The invention thus makes it possible, should an attempt to ignite the main combustion chamber fail, to reduce or avoid the risk of undesirable self-ignition of the fuel/oxidizer mixture in the system as a whole.

Since the auxiliary combustion chamber used for preheating the recuperator is arranged outside the first flow path, the temperature in the first flow path or in the recuperator cannot at any point be higher than that temperature which the gas generated by the auxiliary combustion chamber and fed into the first flow path possesses, this temperature being relatively easily controllable. In particular, in the case of this externally arranged auxiliary combustion chamber, it is unimportant whether the critical self-ignition temperature is exceeded or not locally in it, since the external auxiliary combustion chamber cannot come into contact with the explosive fuel/oxidizer mixture even in the case of a misignition of the main combustion chamber. It may even be expedient, with the aid of the additional firing device, first to generate fuel gases, the temperature of which is above the critical self-ignition temperature, appropriate quantities of cold gases being admixed before the feed into the first flow path, in order to lower the temperature of the gas mixture ultimately supplied to the first flow path below the critical self-ignition temperature. This admixing of cold gas preferably takes place even within the auxiliary combustion chamber, for example by means of a corresponding secondary gas supply.

According to a preferred embodiment, during the preheating of the recuperator, the second flow path may be acted upon by a fresh gas flow flowing through the recuperator, in such a way that a predetermined temperature distribution is formed in the recuperator. This procedure makes it possible to set at the recuperator a temperature distribution which corresponds essentially to that temperature distribution which is established in the recuperator after the start of the turbogroup when the power plant is operating under nominal conditions. This measure thus prevents damage to components of the recuperator as a result of thermal load errors.

In an expedient refinement, this fresh gas flow may be extracted from the second flow path downstream of the recuperator and introduced into the first flow path, upstream of the recuperator, via a first bypass line bypassing the turbogroup. The recuperator can be heated independently of the turbogroup by means of this measure.

An embodiment in which a fresh gas flow used for acting upon the recuperator is employed for purging the turbogroup is particularly advantageous. By virtue of this measure, on the one hand, the turbogroup, too, can be preheated, since the fresh gas flow supplied is preheated in the recuperator. On the other hand, permanent purging of the turbogroup, in particular the main combustion chamber, also takes place as a result, so that even here, before the ignition operation, a separate purging operation can be dispensed with.

According to a particularly advantageous embodiment, the power plant may be designed as a gas storage power plant with a gas store, the fresh gas flow used for acting upon the recuperator and/or for purging the additional firing device and/or for purging the turbogroup, in particular the main combustion chamber, is generated by the extraction of fresh gas from the gas store. Thus, by means of this procedure, the energy stored in any case is used for generating the necessary fresh gas flow, so that additional components for providing the gas are dispensed with.

Since, according to an expedient embodiment, the auxiliary combustion chamber is run down to operation under minimum conditions before the ignition of the main combustion chamber, the preheating of the recuperator and, in particular, of the entire gas-leading system can be maintained even in the event of a misignition of the main combustion chamber. Time delays and energy losses due to a misignition of the main combustion chamber can thereby be reduced.

Further important features and advantages of the invention may be gathered from the subclaims, from the drawings and from the accompanying figure description with reference to the drawing.

BRIEF DESCRIPTION OF THE DRAWING

A preferred exemplary embodiment of the invention is illustrated in the drawing and is explained in more detail in the following description.

The single

DETAILED DESCRIPTION OF THE INVENTION

Figure 1:
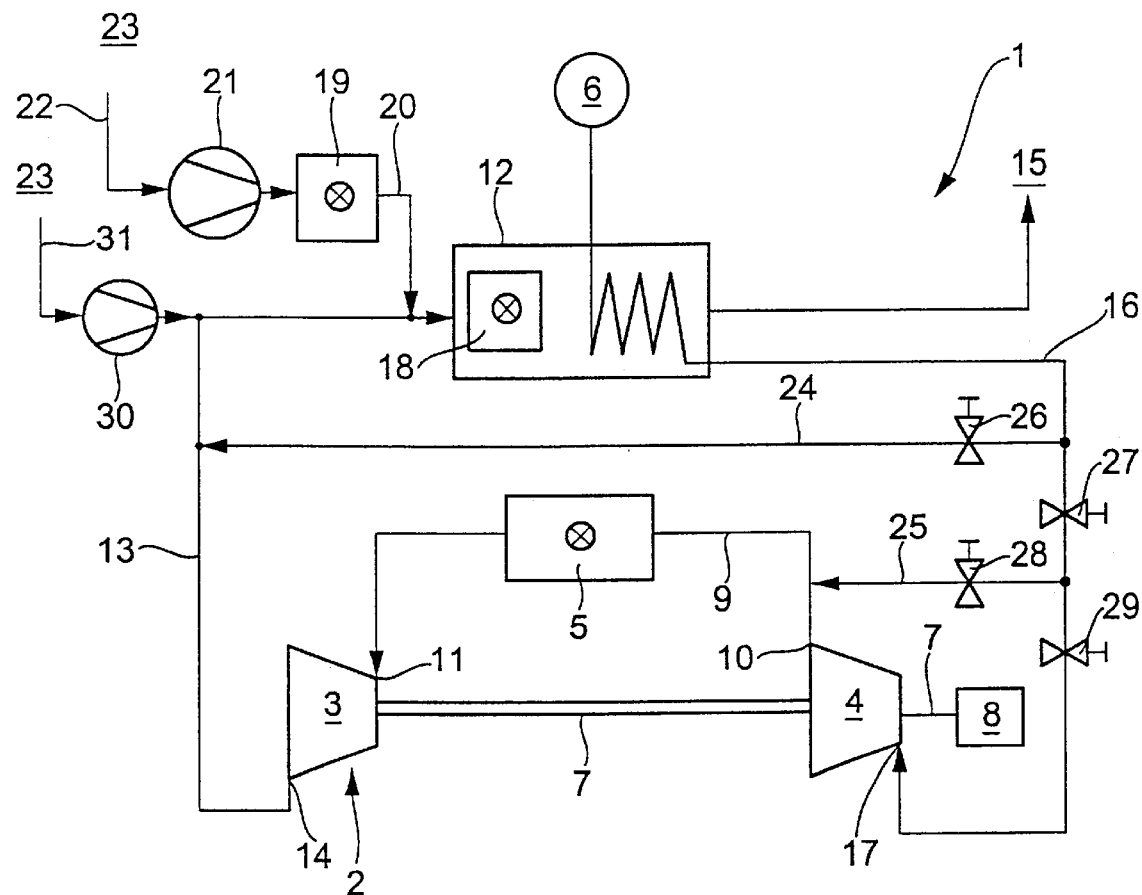
FIG. 1 shows a basic illustration, in the form of a circuit diagram, of a power plant for which the starting method according to the invention is provided.

According to FIG. 1, a power plant 1 has at least one turbogroup 2 which comprises a turbine 3, an additional turbine 4 and a main combustion chamber 5 which is assigned at least one burner, not shown. The power plant 1 illustrated is in this case designed as a gas storage power plant which has a gas store 6. The power plant 1 shown thus forms an integral part of a CAES system, such a CAES system usually operating with air as the storage medium.

The turbine 3 follows the main combustion chamber 5. In contrast to this, the additional turbine 4 precedes the main combustion chamber 5. Insofar as the additional turbine 4 is acted upon solely by air, it may also be designated as an air turbine. The turbine 3 is drive-connected to the additional turbine 4 via a common shaft 7. Furthermore, the turbine 3 and the additional turbine 4 are likewise drive-connected via the driveshaft 7 to a generator 8 which serves for current generation. The main combustion chamber 5 is arranged in an internal flow path 9 of the turbogroup 2, said flow path connecting an outlet 10 of the additional turbine 4 to an inlet 11 of the turbine 3. Fuel is supplied to the main combustion chamber 5 in the usual way, and therefore an illustration of corresponding components of this fuel supply has been dispensed with here.

The power plant 1 comprises, moreover, a recuperator 12 which is assigned to the turbogroup 2 and which, on the one hand, is arranged in a first flow path 13 which transports the gases emerging at an outlet 14 of the turbine 3 away from the turbine 3 and delivers them downstream of the recuperator 12, at 15, for example to an exhaust-gas purification device. On the other hand, the recuperator 12 is arranged in a second flow path 16, via which an inlet 17 of the additional turbine 4 is supplied with gas, the second flow path 16 connecting the additional turbine 4 to the gas store 6 via the recuperator 12. The recuperator 12 operates as a heat exchanger, and, during normal operation, it extracts heat from the gas originating from the turbine 3 and delivers this heat to the gas intended for the additional turbine 4. In order to increase the temperature level in the recuperator 12, the recuperator 12 has arranged in it an additional firing device 18 which may be assigned at least one burner, not shown, and by means of which the temperature of the gas originating from the turbine 3 can be increased. By the recuperator 12 being operated, the temperature of the gas delivered to the additional turbine 4 then also rises. Here, too, a fuel supply for the additional firing device 18 is not illustrated for the sake of clarity.

According to the invention, the power plant 1 possesses, moreover, an auxiliary combustion chamber 19 which is assigned at least one burner, not shown, and which is arranged outside the flow paths 9, 13, 16 of the turbogroup 2. The auxiliary combustion chamber 19 is connected on the outlet side via a delivery line 20, upstream of the recuperator 12 or upstream or downstream of the additional firing device 18, to the first flow path 13. It is also possible to connect the delivery line 20 within the recuperator 12, upstream of the additional firing device 18, to the first flow path 13. The auxiliary combustion chamber 19 is connected on the inlet side to the outlet side of an auxiliary blower or auxiliary compressor 21, the inlet side of which is connected, for example, to the surroundings 23 via a line 22.

A first bypass line 24 connects the second flow path 16, downstream of the recuperator 12, to the first flow path 13, upstream of the recuperator 12. A second bypass line 25 connects the second flow path 16, downstream of the recuperator 12, to the internal flow path 9, upstream of the main combustion chamber 5. The bypass lines 24 and 25 can be activated and deactivated with the aid of valves 26, 27, 28 and 29.

Furthermore, an additional blower 30 may be provided, which is connected, upstream of the recuperator 12, to the first flow path 13. This additional blower 30 can likewise suck in air from the surroundings 23 via a corresponding line 31.

The method according to the invention for starting this power plant 1 operates as follows:

After a stoppage of the power plant 1, that is to say, in particular, after a shutdown of the main combustion chamber 5 and, if present, of the additional firing device 18, the power plant 1 is to be started again, so that, for example for peak-load times, an increased current requirement can be covered. For this purpose, firstly, the auxiliary combustion chamber 19 is purged by the auxiliary blower 21 being correspondingly activated. A purging operation before the ignition of a burner is necessary in order to prevent an uncontrolled combustion or explosion of a fuel/oxidizer mixture which, during the stoppage of the plant, has accumulated in the system, in particular in the respective burner, for example due to leakages. In this case, it may be perfectly appropriate, before the ignition of the auxiliary combustion chamber 19, to purge the complete gas-leading system, in particular the main combustion chamber 5 or the complete turbogroup 2 and the additional firing device 18 or the complete recuperator 12. For purging the turbogroup 2 or its components, to be precise the turbine 3, additional turbine 4 and main combustion chamber 5, for example, a fresh gas flow can be delivered via the second flow path 16. This fresh gas flow may be generated, for example, by means of a corresponding extraction from the gas store 6. The recuperator 12, including the additional firing device 18, can then also be purged via the first flow path 13. For purging the recuperator 12 or the additional firing device 18, the additional blower 30 may also be correspondingly activated additionally or alternatively.

After the purging of the auxiliary combustion chamber 19 and of the other gas-leading components of the power plant 1, the auxiliary combustion chamber 19 is ignited. The auxiliary combustion chamber 19 is subsequently operated in such a way that the gas consequently heated and introduced into the first flow path 13 has a predetermined temperature, this temperature being below a self-ignition temperature of the fuel/oxidizer mixture which is delivered for starting the main combustion chamber 15. Since these hot exhaust gases from the auxiliary combustion chamber 19 flow through the recuperator 12, including the additional firing device 18, the recuperator 12, including the additional firing device 18, can thereby be preheated. To generate the desired fuel gas, the auxiliary combustion chamber 19 is then operated until the recuperator 12, including the additional firing device 18 arranged in it, reaches a predetermined preheating temperature. Since the temperature of the fuel gases generated by the auxiliary combustion chamber 19 and introduced into the first flow path 13 is below the self-ignition temperature, the individual components of the recuperator 12 can also be heated only up to temperatures which at all events are below this self-ignition temperature.

During the preheating of the recuperator 12, a fresh gas flow can be generated by means of corresponding extraction from the gas store 6 and flows through the recuperator 12 in the second flow path 16. What is achieved thereby is that, during the preheating of the recuperator 12, a predetermined temperature profile can build up in the recuperator 12 and reduces the risk of damage due to undesirable thermal stresses. This fresh gas flow can pass, downstream of the recuperator 12, through the first bypass line 24 and/or through the turbogroup 2 into the first flow path 13 and flow via the latter through the recuperator 12 again. As a result, the heat extracted from the recuperator 12 during the first throughflow is delivered again to a greater or lesser extent during the second throughflow.

If only the recuperator 12, including the additional firing device 18 contained in it, is to be preheated, the valves 26 and 27 are switched in such a way that said fresh gas flow bypasses the turbogroup 2 through the first bypass line 24. Such flow routing may be expedient, for example, when the turbogroup 2 already has a temperature suitable for starting.

If the turbogroup 2 or its components 3, 4, 5 are also to be preheated, the first bypass line 24 is deactivated completely or partially by means of a corresponding position of the valves 26, 27 and 29, so that the heated fresh gas flow emerging from the recuperator passes via the second flow path 16 to the turbogroup 2. In this case, by an appropriate actuation of the valves 28 and 29, via the second bypass line 25, the flow routing may also be selected such that the additional turbine 4 is bypassed. In this flow routing, a purging of the components 3, 4, 5 through which the heated fresh gas flows is achieved, this taking place permanently during the preheating operation. Accordingly, here too, separate purging during the ignition of the main combustion chamber 5 may be dispensed with even here, before the ignition operation, a separate purging operation can be dispensed with.

When, after preheating, the recuperator 12 and, if appropriate, the turbogroup 2 have reached the predetermined preheating temperature or a predetermined temperature distribution, the clearance for starting the turbogroup 2 is given. Initially, the auxiliary combustion chamber 19 is not yet shut down, but merely run down to operation under minimum conditions. Insofar as the main combustion chamber 5 and the additional firing device 18 have not already been purged (permanently) during the preheating operation, an additional purging operation for purging the main combustion chamber 5 and the additional firing device 18 is also carried out. When the main combustion chamber 5 and additional firing device 18 are purged, the main combustion chamber 5 is ignited. If this ignition operation goes wrong, an ignitable fuel/oxidizer mixture emerges from the main combustion chamber 5, also arrives via the first flow path 13 at the recuperator 12 and flows through the latter and the additional firing device 18. However, since the preheating temperature is well below the self-ignition temperature of this fuel/oxidizer mixture, as described above, self-ignition does not occur in this case. Since the auxiliary combustion chamber 19 is arranged outside the flow paths 9, 13, 16 of the turbogroup 2, this fuel/oxidizer mixture also cannot come into contact with the hot zones of the auxiliary combustion chamber 19, the temperature of which may perfectly well be higher than the self-ignition temperature of the fuel/oxidizer mixture.

After the successful ignition of the main combustion chamber 5, the auxiliary combustion chamber 19 is shut down. The run-up of the turbine 3 or turbines 3 and 4 and their synchronization then takes place in the usual way and therefore does not have to be explained in any more detail.

After the successful ignition of the main combustion chamber 5, the additional firing device 18 is ignited, in order to increase the temperature level of the fresh gas delivered to the turbogroup 2.

Although the power plant 1 is designed as a gas storage power plant in the preferred embodiment described here, the starting method according to the invention may also be applied, in principle, to a conventionally designed power plant, the turbogroup 2 of this power plant then having, instead of the additional turbine 4, a compressor which is drive-connected to the turbine 3. Since the starting behavior of the power plant 1 can be improved by means of the starting method according to the invention, however, the invention is particularly suitable for application in a gas storage power plant. For whereas a conventional power plant has to be started relatively rarely, according to the fundamental notion of a CAES system a starting operation occurs relatively frequently, in particular daily, in a gas storage power plant, in order thereby to serve the peak loads of the current requirement. An improved, in particular shortened starting behavior is therefore particularly useful in the case of gas storage power plants.

List of Reference Symbols

1 Power plant
2 Turbogroup
3 Turbine
4 Additional turbine
5 Main combustion chamber
6 Gas store
7 Drive shaft 8 Generator
9 Internal flow path
10 Outlet of 4
11 Inlet of 3
12 Recuperator
13 First flow path
14 Outlet of 3
15 Gas purification device
16 Second flow path
17 Inlet of 4
18 Additional firing device
19 Auxiliary combustion chamber
20 Delivery line
21 Auxiliary blower
22 Line
23 Surroundings
24 First bypass line
25 Second bypass line
26 Valve
27 Valve
28 Valve
29 Valve
30 Additional blower
31 Line

What is claimed is:

1. A method for starting a power plant comprising a turbogroup with at least one turbine and with a main combustion chamber which is assigned at least one burner, a recuperator which is arranged, on the one hand, in a first flow path leading exhaust gas away from the turbogroup and, on the other hand, in a second flow path leading fresh gas toward the turbogroup, and an auxiliary combustion chamber which is assigned at least one burner and which is arranged outside the first flow path and is connected on the outlet side, at or upstream of the recuperator, to the first flow path, with the following steps:

S1: ignition of the auxiliary combustion chamber,
S2: operation of the auxiliary combustion chamber in such a way that the consequently heated gas introduced into the first flow path has a temperature which is below a self-ignition temperature of a fuel/oxidizer/gas mixture delivered to the main combustion chamber for starting the latter,
S3: operation of the auxiliary combustion chamber according to step S2, until the recuperator has a predetermined preheating temperature,
S4: starting of the turbine and the ignition of the main combustion chamber.

2. The starting method as claimed in claim 1, wherein, during the preheating of the recuperator according to step S3, the second flow path is acted upon by a fresh gas flow flowing through the recuperator, in such a way that a predetermined temperature distribution is formed in the recuperator.

3. The starting method as claimed in claim 2, wherein the fresh gas flow is extracted, downstream of the recuperator, from the second flow path and is introduced, upstream of the recuperator, into the first flow path via a first bypass line bypassing the turbogroup.

4. The starting method as claimed in claim 2, wherein, to purge the turbogroup, the fresh gas flow is delivered to the turbogroup via the second flow path.

5. The starting method as claimed in claim 1, wherein, to purge the main combustion chamber, the main combustion chamber is acted upon by a fresh gas flow which is delivered to the turbogroup via the second flow path.

6. The starting method as claimed in claim 1, wherein the main combustion chamber is purged before the ignition of the auxiliary combustion chamber.

7. The starting method as claimed in claim 1, wherein an additional firing device, which is purged before the ignition of the main combustion chamber, is arranged downstream of the auxiliary combustion chamber in the first flow path, upstream of or in the recuperator.

8. The starting method as claimed in claim 7, wherein the additional firing device is ignited only after a successful ignition of the main combustion chamber.

9. The starting method as claimed in claim 7, wherein the additional firing device is purged before the ignition of the auxiliary combustion chamber.

10. The starting method as claimed in claim 7, wherein, to purge the additional firing device, the additional firing device is acted upon by a fresh gas flow which is delivered to the recuperator via the first flow path.

11. The starting method as claimed in claim 10, wherein, to generate the fresh gas flow, an additional blower is provided, which is connected, upstream of the additional firing device, to the first flow path.

12. The starting method as claimed in claim 10, wherein the fresh gas flow for purging the additional firing device is extracted, downstream of the recuperator, from the second flow path and is introduced into the first flow path, upstream of the additional firing device, via a first bypass line bypassing the turbogroup.

13. The starting method as claimed in claim 10, wherein, to purge the additional firing device, the fresh gas flow used for purging the main combustion chamber is lead from the turbogroup to the additional firing device via the first flow path.

14. The starting method as claimed in claim 2, wherein the power plant is designed as a gas storage power plant with a gas store, the fresh gas flow taking place as a result of the extraction of fresh gas from the gas store.

15. The starting method as claimed in claim 1, wherein the auxiliary combustion chamber is run down to operation under minimum conditions before the ignition of the main combustion chamber and is shut down only after a successful ignition of the main combustion chamber.

* * * * *